(No Model.) 2 Sheets—Sheet 2.
J. A. WADE & J. CHERRY.
DYNAMOMETER.
No. 496,963. Patented May 9, 1893.
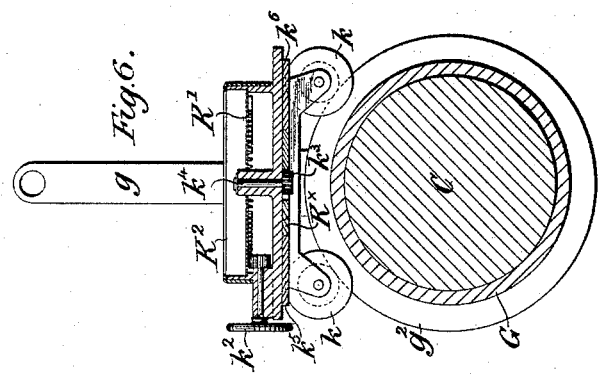
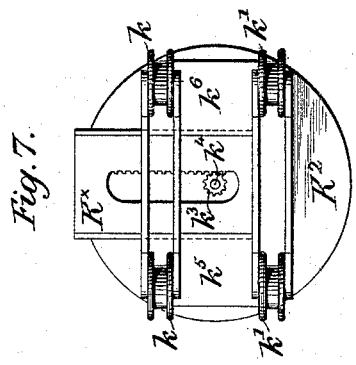
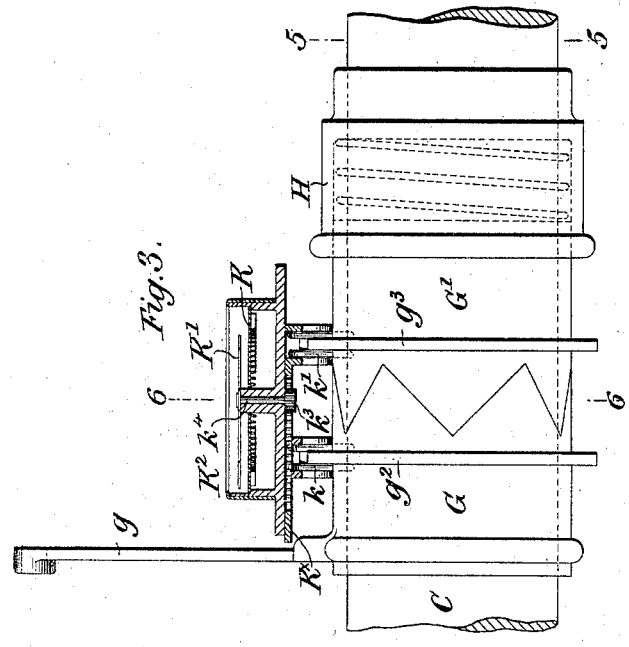
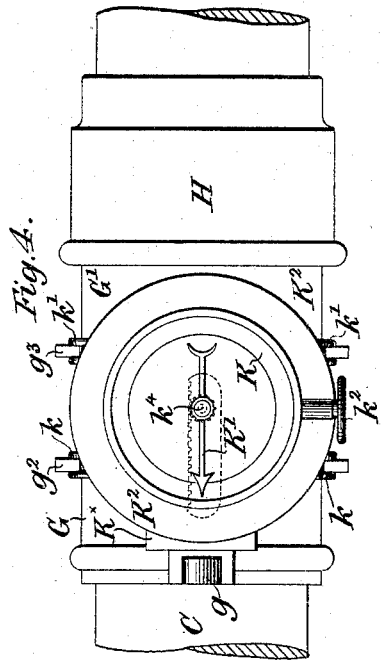
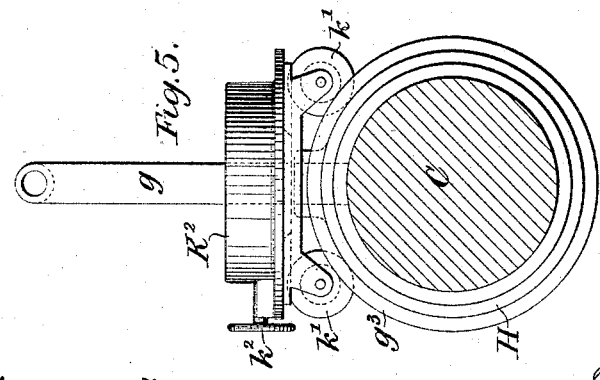
Witnesses:
John Peter Fea
Thomas Winn Abey
Inventors:
Joseph Armytage Wade
John Cherry

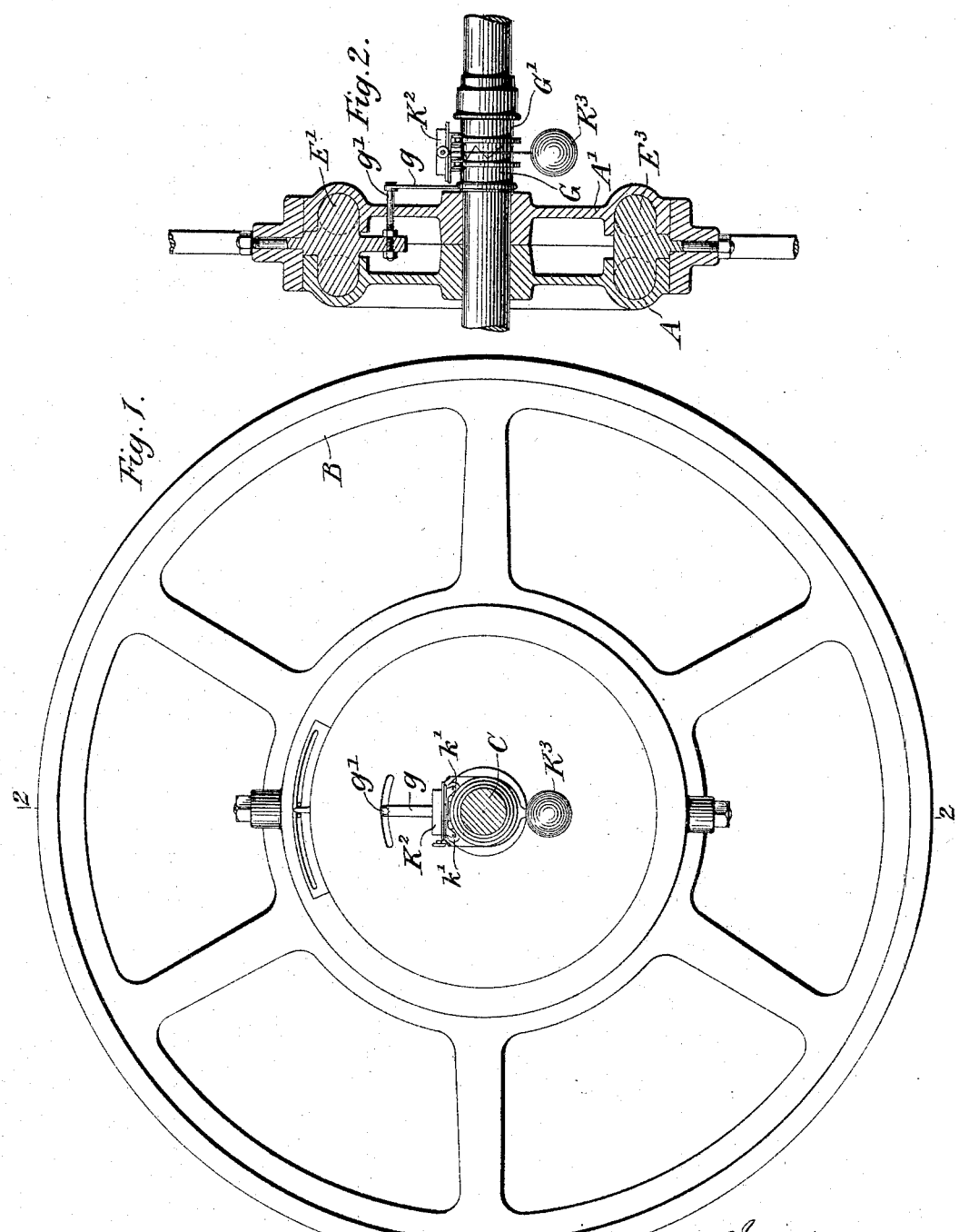

UNITED STATES PATENT OFFICE.

JOSEPH ARMYTAGE WADE AND JOHN CHERRY, OF HORNSEA, ENGLAND.

DYNAMOMETER.

SPECIFICATION forming part of Letters Patent No. 496,963, dated May 9, 1893.

Application filed August 1, 1892. Serial No. 441,842. (No model.) Patented in England April 8, 1892, No. 6,757.

*To all whom it may concern:*

Be it known that we, JOSEPH ARMYTAGE WADE and JOHN CHERRY, subjects of the Queen of Great Britain and Ireland, residing at Hornsea, in the East Riding of the county of York, England, have invented new and useful improved means applicable for use in indicating, registering, communicating, and economizing motive power and in preventing shocks to machinery, (in respect whereof we have applied for but not yet obtained Letters Patent of Great Britain, No. 6,757, to bear date April 8, 1892,) of which the following is a specification.

This invention relates to mechanism arranged or operating as described in our application of November 9, 1891, Serial No. 411,420, and consists of improved means applicable for use, first, in ascertaining and indicating or registering the amount of work being performed by, or the power of, a motor engine actuated by steam, water or other fluid under pressure, by the explosion of gas or vapor, by electricity or by any other source of power; and secondly, in ascertaining the power communicated to a machine or system of machinery through a rotating shaft.

In the accompanying drawings, Figure 1 is a side elevation of a fly-wheel or driving rigger fitted with our invention. Fig. 2 is a cross section on the line 2, 2. (Fig. 1.) Fig. 3 is an enlarged view, partly in side elevation and partly in section, of the indicating device mounted on the shaft; Fig. 4 being a corresponding plan. Fig. 5 is a section on the line 5, 5, and Fig. 6 is a section on the line 6, 6, in Fig. 3. Fig. 7 is a plan of the under side of the casing containing the dial.

The boss A A' of the fly-wheel B, gear-wheel or driving rigger is preferably made in halves; both halves A and A' being keyed or otherwise secured to the shaft C. This wheel (hereinafter called the "fly-wheel") is loosely mounted on the boss A A', so as to be capable of rotating thereon independently for part of a revolution. The wheel and the boss are connected by springs capable of acting against one another; that is, while either spring or set of springs is being compressed, the other spring or set of springs is correspondingly released.

A bipart collar G G' is mounted on the shaft C near the wheel B; V-shaped teeth being formed on the end of each part of the collar. The part G is capable of rotating on the shaft C, but is connected to the wheel by the lever $g$ and pin $g'$, so that it can only rotate on the shaft with the wheel; that is, where there is a differential movement between the shaft and the wheel. The part G may, however, be formed on or otherwise attached to the wheel. The other part G' is connected to the shaft C by a feather working in a feather-way, and can slide longitudinally on and rotate with the shaft, but cannot rotate on the shaft independently. Between the outer end of the sliding part G' and a stop on the shaft there is a spiral spring (represented in dotted lines in Fig. 3), which keeps the V-shaped teeth on the sliding part G' in engagement with the V-shaped teeth on the part G connected to the wheel. The stop may be in the form of a cylinder H entirely inclosing the spring; the sliding part G moving to and fro within the cylinder. On each part of the collar there is a flange $g^2$ or $g^3$; these flanges forming rails on which run the wheels $k$ or $k'$ of the indicating or registering device. This comprises a movable dial K and pointer K' mounted in a suitable casing $K^2$. The dial can be set by rotating a thumb-button $k^2$ provided for the purpose. The casing $K^2$ is furnished on the under side with two double-flanged wheels $k$ which run on the rail $g^2$ pertaining to the part G of the collar. The pointer K' is actuated by a rack $K^\times$, which engages with a pinion $k^3$ on the spindle $k^4$ of the pointer. This rack is preferably in the form of a slide, as shown, containing a slot, from one edge of which the rack-teeth project. This rack-slide works between guides $k^5$ and $k^6$ on the casing; its outer end being furnished with two double-flanged wheels $k'$ which run on the rail $g^3$ pertaining to the sliding part G' of the collar. The dial K is kept horizontal during the rotation of the shaft by means of a weight $K^3$ attached to the casing $K^2$ and hanging below the shaft C.

The action is as follows:—When the wheel B overruns the shaft C, or vice versa, the inner part G of the collar, being connected to the wheel, moves circumferentially on the shaft, its V-shaped teeth pressing on the V-shaped teeth of the sliding part G' of the collar and causing that part to slide, against the action of its spring, into the inclosing cylinder H. The rail $g^3$ on the sliding part G', bearing against the outer flanges of the wheels $k'$ on the rack-slide $K^\times$, moves the wheels and consequently the rack-slide; the casing $K^2$ being, however, prevented from moving because the flanges of its wheels $k$ engage with the rail $g^2$ on that part of the collar which does not slide. The sliding movement of the part G' thus actuates the rack-slide $K^\times$ and turns the pointer K'; thereby indicating or registering the amount of the differential movement which has taken place between the wheel and the shaft. While the wheel and the shaft recover their normal relative positions, the spring in the cylinder H forces the sliding part G' of the collar back into its normal relative position; the pointer K' being at the same time moved back. The dial K can be turned by the thumb-button $k^2$ so as to bring the zero or other mark exactly under the pointer whenever required.

If preferred, the pointer may be worked by cranks instead of by the rack-slide and pinion.

When it is not required to ascertain and indicate the power, the indicating or registering device may be dispensed with.

The boss, instead of being made in halves, may be in one piece and have a suitable cover. The springs, instead of being carried by that part of the boss keyed to the shaft, may be carried by that part of the boss to which the spokes are united.

What we claim as our invention, and desire to secure by Letters Patent, is—

1. The combination, with a shaft, a fly-wheel, gear-wheel or driving rigger mounted so as to rotate with the shaft and also to a limited extent independently about the axis of the shaft, and a part connected to or projecting from the wheel and having V-shaped teeth, of a part which slides on the shaft and has V-shaped teeth in engagement with the V-shaped teeth on the part moving with the wheel, one part causing the other part to slide to an extent corresponding with the differential movement between the wheel and the shaft, substantially as and for the purposes herein set forth.

2. The combination, with a shaft, a fly-wheel, gear-wheel or driving rigger mounted so as to rotate with the shaft and also to a limited extent independently about the axis of the shaft, a part connected to or projecting from the wheel and having V-shaped teeth, and a part which slides on the shaft and has V-shaped teeth in engagement with the V-shaped teeth on the part moving with the wheel, one part causing the other part to slide to an extent corresponding with the differential movement between the wheel and the shaft, of a device for indicating or registering such differential movement, substantially as and for the purposes herein set forth.

3. The combination, with a shaft, and a fly-wheel, gear-wheel or driving rigger mounted so as to rotate with the shaft and also to a limited extent independently about the axis of the shaft, of a bipart collar G G', a lever $g$, rails $g^2$ and $g^8$, a stop H, a spring between the stop and the part G' of the collar, a dial K, a pointer K', a casing $K^2$, a rack $K^\times$, wheels $k'$, and a pinion $k^3$ on the spindle $K^4$ of the pointer K', substantially as and for the purposes herein set forth.

JOSEPH ARMYTAGE WADE.
JOHN CHERRY.

Witnesses:
JOHN PELER FEA,
THOMAS WINN ABEY.